No. 636,572. Patented Nov. 7, 1899.
J. & P. SIEVERS.
CULTIVATOR.
(Application filed May 15, 1899.)

(No Model.) 3 Sheets—Sheet 1.

Witnesses
L. C. Hills.
H. B. Keefer

Inventors
John Sievers
Peter Sievers
By James L. Norris.
Attorney

No. 636,572. Patented Nov. 7, 1899.
J. & P. SIEVERS.
CULTIVATOR.
(Application filed May 15, 1899.)
(No Model.) 3 Sheets—Sheet 2.

Witnesses
L. C. Hills
J. B. Keefer

Inventors
John Sievers
Peter Sievers
By James L. Norris.
Attorney

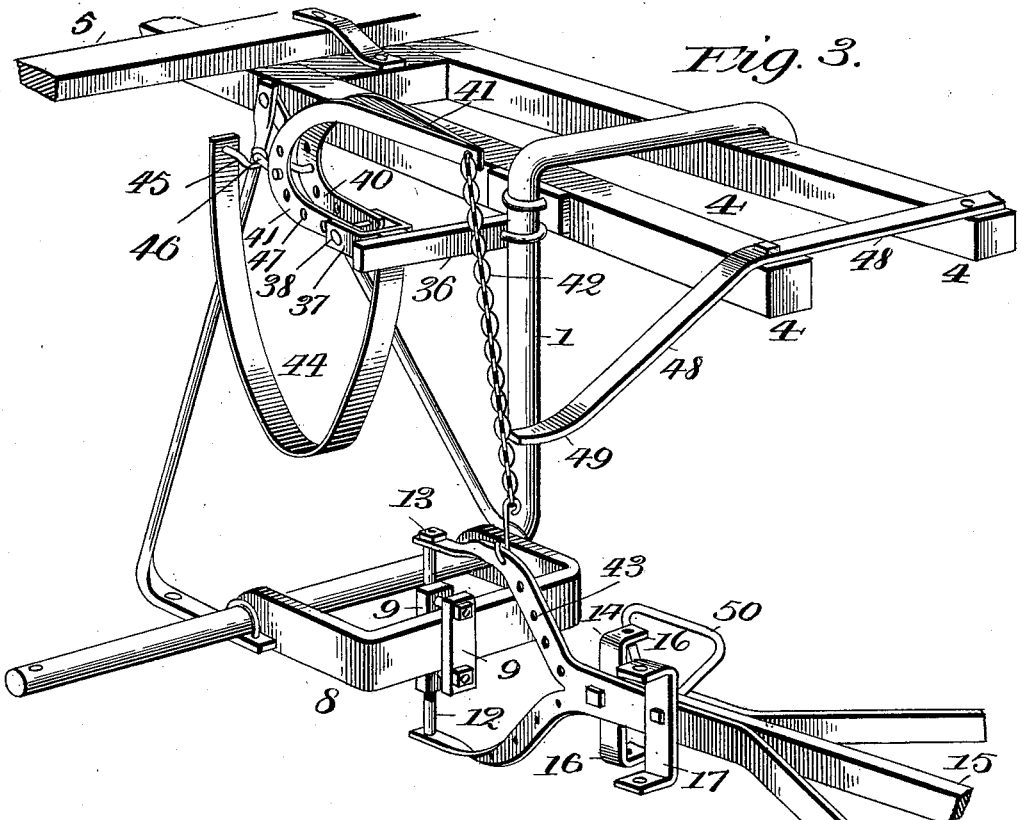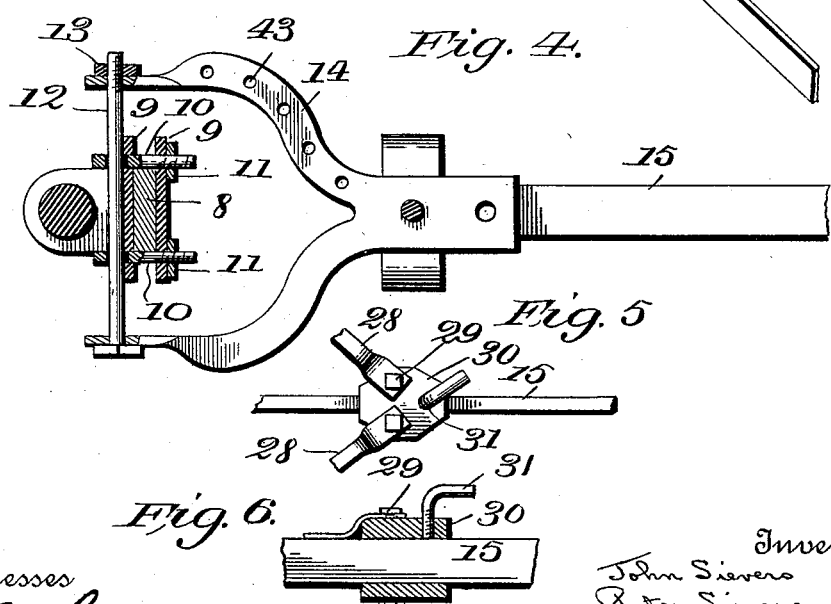

UNITED STATES PATENT OFFICE.

JOHN SIEVERS AND PETER SIEVERS, OF ANDOVER, IOWA.

CULTIVATOR.

SPECIFICATION forming part of Letters Patent No. 636,572, dated November 7, 1899.

Application filed May 15, 1899. Serial No. 716,873. (No model.)

*To all whom it may concern:*

Be it known that we, JOHN SIEVERS and PETER SIEVERS, citizens of the United States, residing at Andover, in the county of Clinton and State of Iowa, have invented new and useful Improvements in Cultivators, of which the following is a specification.

This invention relates to cultivators, and has for its object to provide a cultivator of improved construction by means of which the ground between three rows of growing plants is broken and stirred up simultaneously.

It also has for its object to provide improved means for laterally adjusting the outermost plows of each gang to accommodate the cultivator to work between rows of plants at different distances apart.

It has for another object to provide improved means for adjusting each gang of plows both laterally and longitudinally.

It has for a still further object to provide improved means for yieldingly supporting the plow-gangs in an adjustable manner, and, finally, it has for its object to improve and simplify the construction and render more efficient the operation of this class of cultivators generally.

To these ends our invention consists in the features and in the construction, combination, and arrangement of parts hereinafter described, and particularly pointed out in the claims following the description, reference being had to the accompanying drawings, forming a part of this specification, wherein—

Figure 1:
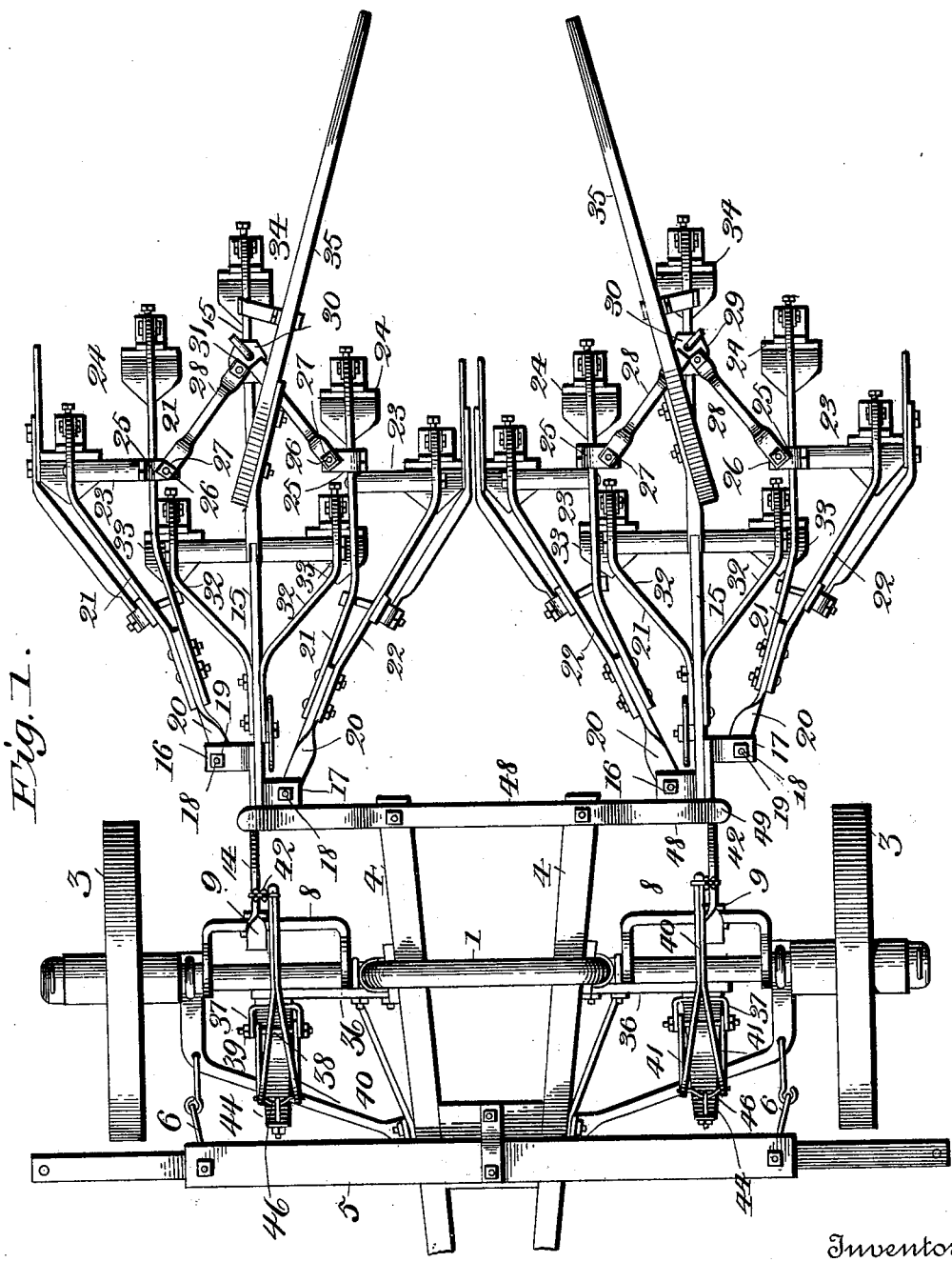
Figure 2:
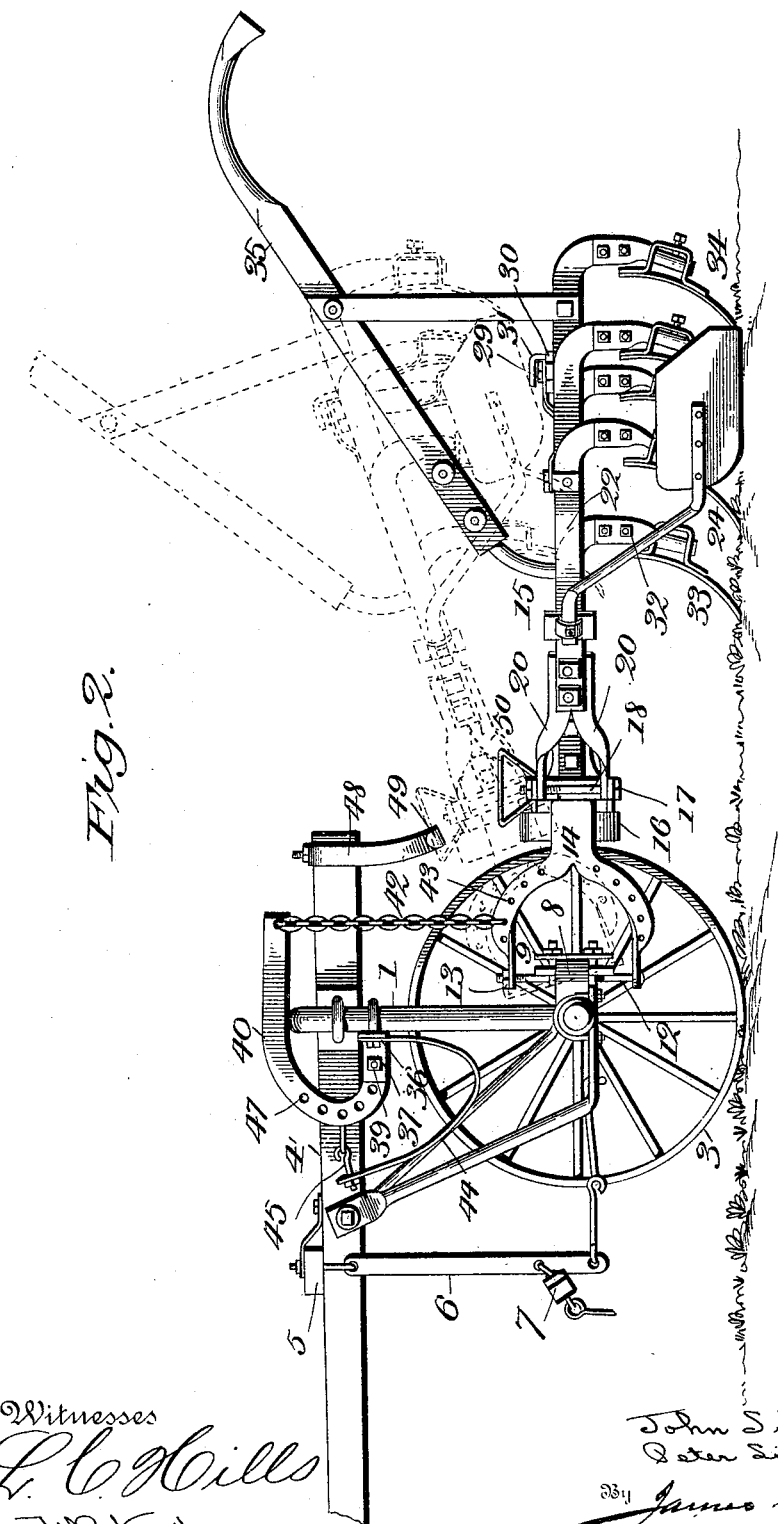

Figure 1 is a top plan view of our improved cultivator. Fig. 2 is a side elevation, one of the ground-wheels being removed. Fig. 3 is a detail perspective view of a portion of the implement. Fig. 4 is a detail top plan view illustrating the means employed for adjustably connecting the plow-gangs to the axle. Fig. 5 is a detail view showing the means for holding the side plows in their laterally-adjusted positions, and Fig. 6 is a longitudinal sectional view of the parts shown in Fig. 5.

Referring to the drawings, the numeral 1 indicates a crank-axle, on the spindles of which are mounted the ground-wheels 3. Clipped to the central cranked portion of the axle are two beams 4, which converge toward their forward ends to form a draft-tongue, and secured to said beams, forward of the axle, is a cross-beam 5, from the opposite ends of which depend hangers 6, which are also secured to the axle, and to said hangers are connected the singletrees 7. All of the foregoing parts are of ordinary and well-known construction and need not be more particularly described.

Arranged on each end of the axle is a yoke-shaped bracket 8. As shown, said bracket consists of a U-shaped piece of flat metal, the ends of which are perforated and fit loosely upon the axle. The bracket 8 is held against endwise movement on the axle in any well-known or preferred manner. Arranged on the opposite sides of the central portion of the bracket 8 are clip-plates 9, through the upper and lower ends of which pass eyebolts 10, over the threaded ends of which latter are screwed nuts 11, by means of which the clip-plates may be tightly clamped to the bracket. Passing through the eyes of the bolts 10 is a vertical pin 12, threaded at its opposite ends, and journaled on the opposite ends of said pin and held thereon by nuts 13, screwed over the threaded ends of the pin, is a bifurcated yoke 14, to the rear end of which the plow-gang is attached, as will more fully hereinafter appear. By loosening the nuts 11 it will be manifest that the pin 12 may be adjusted vertically in the eyebolts and that the clip-plates may also be adjusted horizontally on the bracket, and hence the plow-gang may be adjusted both vertically and horizontally.

Bolted to the rear end of the yoke 14 is a metallic main beam 15, curved downwardly at its rear end to form a plow-foot, and bolted to the opposite sides of said beam and yoke are two vertical U-shaped brackets 16 and 17, the parallel bent ends of which are perforated for the reception of pins 18, threaded at their opposite ends and held in place by nuts 19. On each of the pins 18 is journaled a bifurcated yoke 20, to the opposite sides of the rear end of which are bolted the forward ends of metallic auxiliary or side plow-beams 21 and 22, rigidly connected together by braces 23 and provided at their rear ends with plows 24. The plow-beams 21 and 22 may thus be oscillated about the pins 18 to adjust the plows 24 on the opposite sides of the central main beam 15 toward and from each other independent of any movement of said main beam, and this adjustment is effected by the following means: Bolted to each of the beams 21 is a U-shaped clip 25, in the ends of which are fixed pins 26, secured in place by nuts 27, and journaled on each of said pins is the outer forked end of an arm 28, the inner forked ends of said arms being pivotally connected by bolts 29 to a slide-block 30, arranged to be freely moved on the central beam 15. It will be obvious that if the slide-block 30 is moved rearwardly on the beam 15 the beams 21 and 22, with their plows, will be adjusted toward the center of the gang, and, conversely, that if the slide-block be moved forward said beams and plows will be spread apart. In this manner the width of the strip of ground plowed by each gang of plows is determined. A tail-screw 31 is tapped through the slide-block 30 and is arranged to engage the beam 15 when it is screwed down and hold the slide-block in its adjusted position.

Bolted to the opposite sides of the forward end of each main beam 15 are two short fixed plow-beams 32, to the rear ends of which are attached plows 33, and a similar plow 34 is also attached to the rear end of the beam 15.

As described, two brackets 8 are provided, one being arranged on each spindle of the axle, and to each of said brackets is connected a gang of plows constructed in the manner set forth. To each beam 15 is secured a handle 35, by means of which the operator guides and controls the plows. Each of the plow-gangs is yieldingly supported in a vertical direction from the axle by an adjustable spring-support, which we will now describe. The vertical members of the crank-axle are provided with rigid immovable supports composed of the arms 36, clipped to said vertical members of the axle, and which project outwardly and horizontally in opposite directions, and bolted to the forward side of the outer end of each of said arms is a U-shaped clip 37, through the forward perforated ends of which is fitted a bolt 38, held in place by a nut 39. Pivoted on the bolt 38 are the lower ends of a swinging bracket 40. The bracket 40 comprises two arms 41, united at one end and diverging or spreading apart toward their other ends. As stated, the divergent ends of the arms 41 are pivoted on the bolt 38, and from thence they are curved forward and upward and finally are bent horizontally rearward. Each of said brackets at its upper rear end is provided with a perforation, in which is hooked one end of a chain 42, the other ends of said chains being respectively hooked into any of a number of perforations 43, formed in the upper members of the bifurcated yokes 14. Clamped between the ends of the arms 36 and the clips 37 are strong flat springs 44, each of which projects vertically downward and is thence bent upward and forward and at its free end is provided with a loop or eye 45. Passing through the loop or eye 45 is a crank-shaped pin 46, the opposite ends of which are fitted in any corresponding two of a plurality of perforations 47, formed in the arms 41 of the bracket 40. In operation the springs 44 constantly attempt to expand, and thus swing forward the brackets 40, which in turn, through the medium of the chains 42, have a tendency to lift up the plow-gangs or support a portion of their weights. The lifting power exerted by the brackets may be regulated or varied by shifting the ends of the chains 42 from one perforation to another in the bifurcated yokes 14, and the same result may also be accomplished by shifting the pins 46 from one set of perforations to another in the arms 41 of the brackets 40, thus adjusting the tension of the springs. With a view to increasing the strength or stiffness of the springs 44 the vertical members of the latter, which are clamped to the supporting-arms, preferably consist of two leaves or are made of double thickness, as shown.

For the purpose of supporting the plow-gangs entirely clear of the ground a metallic strap 48 is secured to the rear ends of the beams 4, the ends 49 of which project laterally to each side of the beams and are preferably slightly hook-shaped. Bolted to the forward portions of each of the plow-beams is a loop 50. In conveying the cultivator to and from the field the gangs are raised and the loop 50 slipped over the ends of the strap 48, thus holding the plows elevated out of contact with the ground.

The operation of our improved cultivator will be readily understood by those skilled in the art. The implement will be driven across the field in such manner that the two gangs of plows will straddle a row of growing plants, and each gang will break up and stir the ground not only for a portion of the space on each side of the row straddled, but the entire width of such spaces and up to the rows on each side of the straddled row, and when the end of the row is reached and the implement is started back to cultivate the next rows instead of the gangs being caused to straddle the row next adjacent to that previously straddled they are caused to straddle the second row therefrom. It will thus be seen that the implement cultivates a very large area of ground in a given time and that neither of the gangs ever traverse the space between any two rows a second time.

The gangs of plows are adjusted to plow between rows planted at different distances apart by moving the two outermost plows on each side of each gang toward and from the central plow-beam in the manner before described, thereby altering the width of the plow-gangs, and this may be still further regulated by adjusting the yokes 14 horizontally on the brackets 8 in the manner set forth. The inclination of the plows relatively to the ground, and hence their penetration, may be regulated by adjusting the yokes 14 vertically by means of the pins 12 and eyebolts 10. Owing to the weight of the plow-gangs, it would be difficult and laborious for the plowman to guide and control the operation of the same if no provision were made for aiding him; but by yieldingly supporting the gangs by means of the spring-supports in the manner described a portion of the weight is transferred to and carried by the wheeled frame, and the proportion of the weight thus carried may be adjusted to almost any extent by lengthening or shortening the chains or by adjusting the tension of the springs, or by both, as has been heretofore explained.

Having described our invention, what we claim is—

1. In a cultivator, the combination with a wheeled axle, of two gangs of plows connected to the axle, each gang comprising a central beam carrying a plow at its rear end, a yoke pivotally connected to each side of the forward portion of the central beam, two plow-beams rigidly connected to each of said yokes and provided with plows, a slide-block on the central beam, arms pivotally connecting the plow-beams to said slide-block, and means for locking the slide-block to the central beam, substantially as described.

2. In a cultivator, the combination with a wheeled axle, of two gangs of plows connected to the axle, each gang comprising a central beam carrying a plow at its rear end, a yoke pivotally connected to each side of the forward portion of the central beam, two plow-beams rigidly connected to each of said yokes and provided with plows, a slide-block on the central beam, arms pivotally connecting the plow-beams to said slide-block, means for locking the slide-block to the central beam, and stationary plow-beams bolted to the forward portion of the central beam and provided with plows, substantially as described.

3. In a cultivator, the combination with a wheeled axle, of two gangs of plows connected to the opposite ends of the axle, each gang comprising a central beam, a yoke pivotally connected to each side of the forward portion of the central beam, two plow-beams rigidly connected to each of said yokes and provided with plows, braces rigidly connecting each pair of said plow-beams, a slide-block on the central beam, arms pivotally connecting the innermost of said plow-beams to the slide-block, and means for locking the slide-block on the central beam, substantially as described.

4. In a cultivator, the combination with a wheeled axle, of two gangs of plows connected to the axle, each gang comprising a central beam carrying a plow at its rear end, a yoke pivotally connected to each side of the forward portion of the central beam, two plow-beams rigidly connected to each of said yokes and provided with plows, a slide-block on the central beam, arms pivotally connecting the plow-beams to said slide-block, and a tail-screw carried by the slide-block and operating to engage the central beam and hold the slide-block in its adjusted position, substantially as described.

5. In a cultivator, the combination with a wheeled axle, of vertically-swinging yoke-shaped brackets journaled at the ends of the axle, clip-plates arranged on the opposite sides of said brackets and adjustable laterally thereupon, vertical pins adjustable to different heights, clamp-bolts having eyes for the passage of said pins and serving to clamp the clip-plates and the pins when adjusted, a yoke journaled on the ends of the vertically-adjustable pins, and a gang of plows connected with said yoke, substantially as described.

6. The combination with a wheeled axle, of a vertically-swinging yoke-shaped bracket, a clamp adjustable laterally on said swinging bracket and swinging therewith, a pin vertically adjustable to different heights in said bracket, a yoke journaled to the ends of said vertically-adjustable pin, and a gang of plows connected with said yoke, substantially as described.

7. In a cultivator, the combination with a wheeled axle, and a vertically-swinging plow-beam, of a rigid, immovable support mounted above the front end of the plow-beam, an upwardly and rearwardly curved bracket pivotally connected to the rigid, immovable support, a spring operating to swing the bracket upward, and a connection between said bracket and said plow-beam, substantially as described.

8. In a cultivator, the combination with a wheeled axle, and a vertically-swinging plow-beam, of a support mounted above the front end of the plow-beam, an upward and rearward projecting bracket pivotally connected with the support, a spring for swinging the bracket upward, devices for connecting the spring to different points of said bracket, a chain secured at one end to the bracket, and means for connecting the other end of the chain to different points of said swinging plow-beam, substantially as described.

9. In a cultivator, the combination with a wheeled axle and a plow-gang connected thereto by a gimbal-joint, of a fixed support above the axle, an upwardly and rearwardly curved bracket pivotally connected to said support, a spring operating to throw said bracket upward and forward about its pivot, a chain connected at one end to the free end of the bracket and means for connecting the other end of the chain with the plow-gang at varying distances from said gimbal-joint, substantially as described.

10. In a cultivator, the combination with a wheeled axle and a plow-gang connected thereto by a gimbal-joint, of a fixed support above the axle, an upwardly and rearwardly curved bracket pivotally connected to said support, a spring operating to throw said bracket upward and forward about its pivot, means for varying the tension of the spring, and a chain connecting the free end of the bracket to the plow-gang, substantially as described.

11. In a cultivator, the combination with a wheeled axle, a vertically-swinging plow-beam, and devices for laterally adjusting the front end of the plow-beam, of a rigid and immovable support mounted above the front end of the said plow-beam, a bracket pivotally connected with said rigid and immovable support, a chain connecting the bracket with the plow-beam, and a spring for swinging the bracket upward, substantially as described.

12. In a cultivator, the combination with a wheeled axle, and a vertically-movable plow-beam, of a rigid support mounted above the front end of the plow-beam, a bracket pivotally connected with the rigid support and having a plurality of orifices, a spring secured at one end and having means at the other end to engage any of said orifices to vary the tension of the spring, and a connection between said bracket and the plow-beam, substantially as described.

13. In a cultivator, the combination with a wheeled axle and a plow-gang connected thereto by a gimbal-joint, of a fixed support above the axle, an upwardly and rearwardly curved bracket comprising two arms united at their upper rear ends and diverging toward their front lower ends, said lower ends being pivotally connected to the said support, and the free upper end connected to the plow-gang by a chain, a spring clamped at one end to the said support and projecting downwardly and thence upwardly, a loop or eye connected to the free end of the spring, and a pin passing through said eye and. interchangeably inserted in any two of a number of perforations formed in the diverging arms of the bracket, substantially as described.

In testimony whereof we have hereunto set our hands in presence of two subscribing witnesses.

JOHN SIEVERS.
PETER SIEVERS.

Witnesses:
A. H. PADDOCK,
FR. DIECKMANN.